United States Patent [19]
Ast et al.

[11] Patent Number: 5,315,073
[45] Date of Patent: May 24, 1994

[54] LOAD MEASURING APPARATUS, IN PARTICULAR WEIGHING SCALE

[75] Inventors: Adolf Ast; Erwin Enzmann; Walter Holike, all of Messstetten, Fed. Rep. of Germany

[73] Assignee: Mettler-Toledo (Albstadt) GmbH, Albstadt, Fed. Rep. of Germany

[21] Appl. No.: 16,275

[22] Filed: Feb. 11, 1993

[30] Foreign Application Priority Data

Feb. 14, 1992 [DE] Fed. Rep. of Germany ....... 4204480

[51] Int. Cl.$^5$ ............................ G01G 7/00; G01G 3/08
[52] U.S. Cl. ...................................... 177/212; 177/229
[58] Field of Search ................................ 177/212, 229

[56] References Cited

U.S. PATENT DOCUMENTS

| | | | |
|---|---|---|---|
| 3,677,357 | 7/1972 | Baumgartner | 177/188 |
| 4,938,301 | 7/1990 | Stadler et al. | 177/212 |
| 4,991,973 | 2/1991 | Maaz et al. | 177/212 X |
| 5,096,007 | 3/1992 | Burkhard | 177/212 X |
| 5,141,066 | 8/1992 | Strickler | 177/212 |
| 5,174,401 | 12/1992 | Kunz | 177/212 |

FOREIGN PATENT DOCUMENTS

| | | |
|---|---|---|
| 0291258 | 11/1988 | European Pat. Off. . |
| 0393323 | 10/1990 | European Pat. Off. . |
| 0518202 | 12/1992 | European Pat. Off. . |
| 2935654 | 4/1980 | Fed. Rep. of Germany . |
| 3218943 | 11/1983 | Fed. Rep. of Germany . |
| 3243350 | 6/1986 | Fed. Rep. of Germany . |
| 3012979 | 5/1989 | Fed. Rep. of Germany . |
| 549695 | 6/1977 | U.S.S.R. . |
| 1117454 | 10/1984 | U.S.S.R. . |

OTHER PUBLICATIONS

Patent Abstracts of Japan, vol. 14, No. 349 (P-1084) (4292), Jul. 27, 1990.

Primary Examiner—George H. Miller, Jr.
Attorney, Agent, or Firm—Jacobson, Price, Holman & Stern

[57] ABSTRACT

Figure 1:
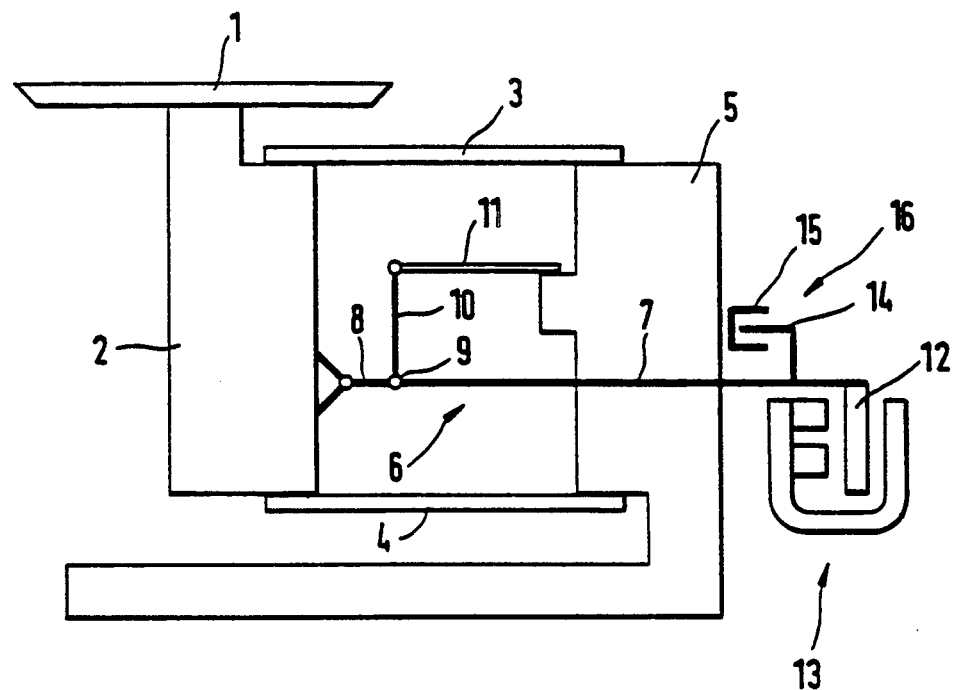

In a weighing scale including a load receiving member (2) being elastically deflectably guided by virtue of a parallel guide mechanism (3, 4) is provided an electromagnetic compensating system (12, 13, 16) for detecting the deflection which is proportional to the load. In order to achieve high precision and a simple construction, a lever (6) being located between said compensating system and said load receiving member (2) is supported on an elastic member (11), thereby preventing any positional changes in the compensating system or any non-homogeneity errors associated therewith (FIG. 1).

10 Claims, 1 Drawing Sheet

LOAD MEASURING APPARATUS, IN PARTICULAR WEIGHING SCALE

This invention relates to a load measuring apparatus, in particular a weighing scale, comprising a load receiving member being elastically deflectably guided relative to a stationary member in the direction of the load to be measured, and magnetic compensating means including a magnet arrangement, a compensating coil located in the magnetic field generated by said magnet arrangement, a rigid lever being elastically supported relative to said stationary member, said compensating coil being supported by the one arm of said rigid lever, a position sensor detecting a predetermined relative position of said lever in said load measuring apparatus, and electrical means regulating the compensating current flowing through said compensating coil depending on the output signal from said position sensor such that said predetermined relative position is held, and establishing a measuring value for the load to be measured on the basis of the regulated compensating current.

The principle of measurement of load measuring apparatus of this type is based on the fact that the elastic deflection of the load receiving member which is caused by the load to be measured, for example by the weight of an article to be weighed, is proportional to the load to be measured. As a consequence, in order to obtain a value representing the load to be measured, for example a digital value indicating the load to be measured in a specific system of units, it is necessary to detect the elastic deflection of the load receiving member.

In a conventional load measuring apparatus of the type mentioned initially above (German Patent Application 32 18 943), the elastic deflection of the load receiving member is detected with the aid of the electromagnetic compensating means by which the lever supporting at its one lever arm the compensating coil is caused to follow, against the elastic bearing force acting on it, the elastic deflection of the load receiving member, and by which the measuring value representing the load to be measured is established on the basis of the amount of compensating current required. For this purpose, the fulcrum of the lever is in the form of a flectional bearing at the stationary member of the load measuring apparatus, which flectional bearing bears the lever elastically in its rotational direction. The other lever arm opposing the lever arm that supports the compensating coil supports the one element of a position sensor formed by a pair of elements, the other element thereof being arranged on the load receiving member. Thereby, the position sensor indicates a tendency of the position to change between the lever arm supporting the one element and the load receiving member supporting in opposition thereto the other element, and regulates through its output signal by means of the electrical means the compensating current flowing through the compensating coil such that the relative position between the lever and the load receiving member is held when the latter is elastically deflected. Thus, the torque occurring in this case at the flectional bearing serving to bear the lever, which torque is proportional to the elastic deflection of the load receiving member, is compensated during this positional control by the compensating coil and, on the basis of the compensating current flowing through the latter, it is consequently possible to establish the measuring value representing the load to be measured.

In this context, however, there exists the problem that, due to the rotation of the lever occurring during the follow-up movement of the lever, the compensating coil moves relative to the permanent magnet which generates the magnetic field and is arranged on the stationary member and that non-homogenieties of the magnetic field affect the result of measurement because of the fact that thereby the relative position between the permanent magnet and the compensating coil is changed. In order to keep the thereby caused measurement errors small, there exist thus great demands on the homogeneity of the magnetic field throughout the entire region of possible positions of the compensating coil relative to the permanent magnet, for which reason the apparatus is relatively complex in design. To avoid this difficulty existing with the change in the relative position between the compensating coil and the permanent magnet, German Patent Application 32 18 943 therefore also describes an alternative embodiment wherein the compensating coil is guided by means of an elastic parallel guide mechanism on the stationary member in the direction of the load to be measured and wherein the permanent magnet arrangement generating the magnetic field is fixed to the movable load receiving member. This arrangement, too, requires a relatively complex design. Besides, the reaction force prevailing between the compensating coil and the permanent magnet generating the magnetic field undesirably retroacts on the load to be measured which is applied to the load receiving member. Given that in this arrangement the deflection of the position sensor directly corresponds to the merely small deflection of the load receiving member and no increase in deflection is caused by the lever transmission, extraordinarily great demands have to be made on the design of the position sensor for achieving high measuring accuracy.

Furthermore, there are known load measuring apparatus of a different type wherein the one arm of a rigid lever which is supported on the stationary member is coupled to the load receiving member which is guided parallel to said stationary member and the other lever arm supports the compensating coil of an electromagnetic force-compensating means. The compensating current is controlled such that the entire load exerted on the load receiving member is in a condition of equilibrium. These load measuring apparatus wherein the load receiving member thus does not undergo a finite deflection with respect to the stationary member but is always held in its zero position by the compensating means, however, require in the case of heavy loads to be measured a correspondingly high compensating force in the electromagnetic compensating means and/or a high lever ratio of the force transmitting lever or levers. In such case, however, there exists the problem that there is a relatively high electrical power loss in the compensating means and that a mechanically complex design, respectively, of the force transmitting lever or levers is required.

The object of the present invention is to provide a load measuring apparatus of the type mentioned initially above that has a simple structure and a high accuracy of measurement.

According to the invention, this object is achieved in that the other arm of said lever is mechanically coupled to said load receiving member, that the elastic displacement of the fulcrum of the lever takes place in the direction of deflection of the load receiving member, and that said position sensor detects the relative position between the magnet arrangement and the compensating coil.

Thus, in the inventive apparatus the elastic deflection caused by the load to be measured at the load receiving member is transmitted to the lever which is mechanically coupled via the respective lever arm to the load receiving member. However, the elastic deflection of the load receiving member is converted not only into a corresponding rotation of the lever around the fulcrum thereof because the position sensor detects the relative position between the compensating coil and the magnet arrangement and thereby the portion of the respective lever arm that supports the compensating coil is nearly locked in its position relative to the magnet arrangement. As a consequence, the elastic deflection of the load receiving member causes a corresponding elastic deflection of the fulcrum of the lever along its elastic path which extens parallel to the deflection direction of the load receiving member, whereby the compensating force to be produced by the compensating means is determined, on the one hand, by the ratio between the two lever arms and, on the other hand, by the ratio between the elastic constants determining the elastic deflection of the load receiving member and the elastic deflection of the lever fulcrum. Owing to the elastic deflection provided for the fulcrum of the lever, it is thus possible to keep the relative position between the compensating coil and the magnet arrangement constant so that no errors which are due to non-homogeneities of the magnetic field can occur. Apart from this exclusion of non-homogeneity errors, the load measuring apparatus according to the invention is distinguished by its simple construction. In particular, the magnet arrangement and the position sensor may be arranged on the stationary member. Furthermore, one is widely free as to the arrangement of the lever in the load measuring apparatus, as long as an elastic deflection of the lever fulcrum is guaranteed. For example, the lever may have either one arm or else two arms, i. e. the geometry may be such that the lever arms extend away from the fulcrum in the same direction, or in opposite directions with respect to the fulcrum.

In an advantageous embodiment, the lever ratio between the lever arm supporting said compensating coil and the lever arm being coupled to said load receiving member is higher than 1. In this case, as a result of the transmission, the deflection of the lever arm supporting the compensating coil in the region of the position sensor is higher than the elastic deflection of the load receiving member and the fulcrum, respectively, for which reason accordingly lower demands can be made on the accuracy of the position sensor.

Furthermore, in a preferred embodiment of the invention, the ratio between the elastic force of the guide means for the load receiving member and the elastic force of the support for the fulcrum of the lever is large as compared to 1. In this case, the compensating force to be produced by the compensating means is determined practically only by the extent of the elastic deflection and the elasticity coefficient applying for the elastic deflection of the lever fulcrum, as a consequence of which the possibly heavy loads to be measured are supported by the elastic guide for the load receiving member alone.

In an embodiment being particularly advantageous in structural respects, said load receiving member is connected to said stationary member by means of transversely elastic link members in the form of a parallelogram guide wherein said link members extend along two opposing sides of the parallelogram and the load-receiving member and the stationary member, respectively, extend along the other two opposing sides of the parallelogram, and said lever is supported on a transversely elastic member extending in its longitudinal direction out from said stationary member between said link members forming the two sides of the parallelogram. Due to the fact that the elastic deflection required for the fulcrum of the lever is effected by means of the transversely elastic member supporting—possibly via an interposed pull-type or pressure-type coupling member—the fulcrum, the invention can particularly easily be implemented in load receiving members that otherwise have a conventional parallelogram guide and the simple construction and robustness of which have proven to be worthwhile in practice.

In particular, it is advantageous in this connetion when the elasticity of said link members is localized to the portions thereof adjoining the corners of the parallelogram, and when the elasticity of said transversely elastic member is localized to the portion thereof adjoining said stationary member. In particular, since the required elasticity characteristics are obtained by way of such locally concentrated bending portions, a precise machining of these bending portions is possible so that the elastic properties can be exactly controlled.

Finally, the structure of the load measuring apparatus according to the invention is particularly advantageous when said load receiving member, said stationary member, said link members, said lever and said transversely elastic member are formed by the solid portions of a single-piece solid block, and when said solid portions are separated from one another by no-material portions in the form of gaps in said solid block and are linked together only at localized solid portions of said solid block.

In this single-piece construction of the essential parts of the load measuring apparatus, the mounting and adjusting work otherwise necessary is no longer required. The solid portions of the solid block where the individual parts are linked simultaneously form the bending portions and coupling members, respectively, which are constructed such that the required elasticity characteristics are obtained. In particular, by appropriately selecting the thickness of the portions where the link members are connected to the load receiving member and the stationary member, respectively, and the transversely elastic member is connected to the stationary member, the elasticity coefficient applying during the deflection of the load receiving member as well as the elasticity coefficient applying during the elastic deflection of the lever fulcrum can be set to the respectively desired values.

Additional features, details and advantages of the invention will be apparent from the following description and the drawings which are explicitly incorporated herein by way of reference for the purpose of disclosure of any details of the invention not mentioned before. Shown are, in FIG. 1, the schematic structure of an embodiment of the inventive load measuring apparatus and, in FIG. 2, single-piece-type embodiment corresponding to the schematic structure of FIG. 1.

Referring to FIG. 1, a weighing scale shown therein has a load receiving member 2 which carries a weighing platform 1 for receiving the article to be weighed and is deflectably guided, by means of a pair of link members 3, 4 extending horizontally in spaced relationship with respect to each other, on a stationary member 5 forming a support for the weighing scale in the vertical direction of the weight exerted by the article to be weighed. Due to the transverse elasticity of the link members 3, 4, which are rigid in their horizontal longitudinal direction, the load receiving member 2 under the effect of the weight acting on it undergoes an elastic deflection proportional to said weight, the extent of said deflection being determined by the elastic constant of the parallel guiding mechanism formed by the link members 3, 4.

A double-armed rigid lever 6 illustrated only schematically in FIG. 1 is pivotably supported, at its fulcrum 9 located between its one lever arm 7 and its other lever arm 8, on a vertically extending pull-type coupling member 10 which is linked via its other end opposite the fulcrum 9 to a transversely elastic member 11 extending horizontally out from the stationary member 5 between the lever 6 and the upper link member 3. Instead of such elastic suspension of the lever 6 on the transversely elastic member 11 via the pull-type coupling member 10, the lever 6 may alternatively be supported on a pressure-type coupling member extending vertically between the fulcrum 9 and the transversely elastic member 11 which would then be arranged between the lever 6 and the lower link member 4.

On the free end of the one lever arm 7 that is opposite the fulcrum 9 and projects beyond the stationary member 5 is arranged a compensating coil 12 of an electromagnetic compensating means whose magnetic field is generated by a magnet arrangement 13 being fixed relative to the stationary member 5. Moreover, near said free end supporting the compensating coil 12 there is arranged one half 14 of a position sensor 16 the other half 15 of which is mounted to the stationary member 5 whereby the position sensor 16 can detect whether a constant relative position between the compensating coil 12 and the magnet arrangement 13 is held. The end of the other lever arm 8 that is opposite the fulcrum 9 is pivotably linked to the load receiving member 2.

The output signal from the position sensor 16 serves as a control input signal for electrical means (not shown in the drawing) by which, depending on the said output signal from the position sensor 16, compensating current is supplied in such an amount to the compensating coil 12 such that, due to the effect of the force between the compensating coil 12 and the magnetic field generated by the magnet arrangement 13, the relative position detected by the position sensor 16 is held also in the case of an elastic deflection of the load receiving member 2 under the influence of an article to be weighed. Thus, the compensating force produced by the compensating current at the coil 12 corresponds to the force being transmitted as a consequence of the deflection of the load receiving member 2 by the weight of a load to be weighed and the attendant elastic deflection of the fulcrum 9 against the resilient force of the transversely elastic member 11 to the end of the one lever arm 7 supporting the compensating coil 12. In particular, the elastic constant of the transversely elastic member may be selected to be very small as compared to the elastic constant of the link members 3, 4, whereby the weight of the load to be weighed is practically completely taken up by the elastic counterforces of the link member 3, 4, whereas the lever 6 practically only transmits to the compensating coil 12 the elastic counterforce of the transversely elastic member 11 caused by the elastic deflection of the fulcrum 9. Therefore, even in the case of heavy weights, the amount of the counterforce to be produced by the compensating coil 12 can therefore be kept small by appropriately dimensioning the transversely elastic member 11.

The compensating current flowing through the coil 12 is proportional to the weight of the load deposited on the weighing platform and the proportional constant is determined both by the ratio between the elastic forces produced by the link members 3, 4 and the transversely elastic member 11 and the lever ratio between the lever arms 7, 8. As a consequence, it is possible to obtain with the aid of the electrical means a value that measures the load to be weighed in an arbitrary system of units on the basis of the compensating current, e. g. by detecting the voltage drop caused by the compensating current at a measurement resistor and by digitalizing it in an A/D converter.

Figure 2:
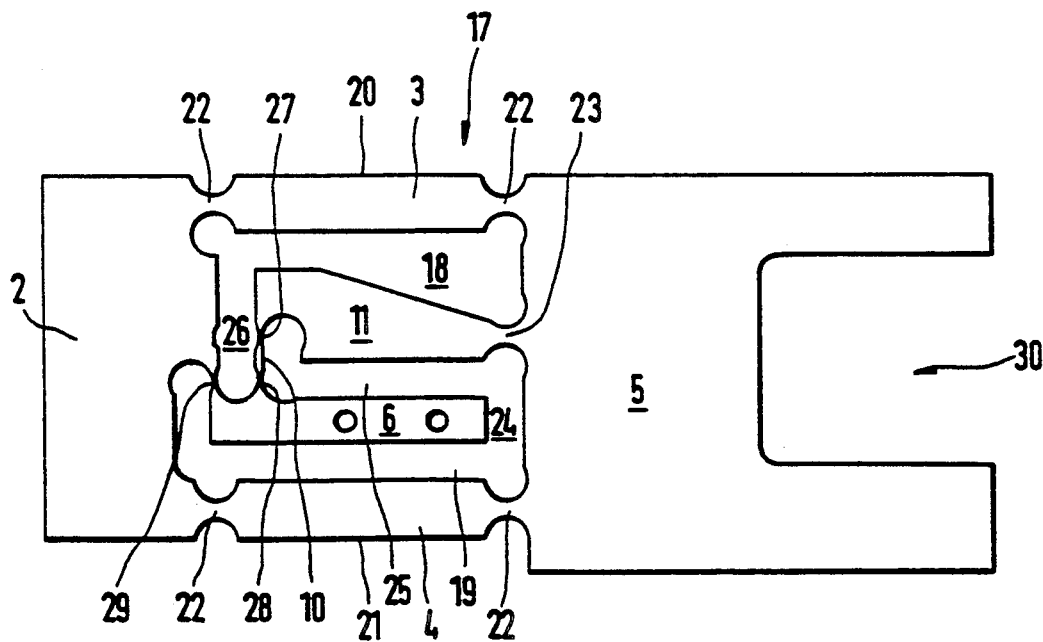

While in the schematic representation of FIG. 1 the parts serving to receive the load and transmit it to the compensating coil 12 are separate component parts which are assembled to form the weighing scale, in practice it is particularly advantageous according to the illustration of FIG. 2 when these parts are linked in one piece as the solid portions of a single solid block 17. For this purpose, no-material portions are formed in the solid block 17 in such a way that they bound the individual parts with respect one another. For example, no-material portions 18 and 19 bound at their edges facing the two parallel outer edges 20, 21, respectively, of the roughly rectangular solid block 17 and extending parallel to the outer edges 20 and 21, respectively, between themselves and the outer edges 20, 21, the link members 3, 4 whose ends link the load receiving member 2 and the stationary member 5, respectively, via elastic bending portions 22. The thickness of these bending portions 22 is reduced as compared to the thickness of the link members 3, 4 by curved recesses as viewed in the plane of the parallelogram guide, such that the desired elasticity characteristics are obtained.

The no-material portion 18 bounds at its edge facing away from the link member 3 a solid portion which forms the transversely elastic member 11 and is linked to the stationary member 5 at a bending portion 23 providing the desired transverse elasticity. The no-material portion 19, which extends substantially in the direction of the link member 4, has an extension adjoining the load receiving member 2 and extending approximately as far as to the midpoint of the distance between the outer edges 20, 21 and perpendicularly to the direction of the link members 3, 4, and bounds the lever 6 by its inner edge facing away from the load receiving member 2 and the link member 4. Between the edges of the transversely elastic member and the lever 6, respectively, that face away from the no-material portions 18, 19 extends a no-material portion 25 which is connected to the no-material portion 19 via a no-material portion 24 extending along the stationary member 5. Between the end of the no-material portion 25 that faces away from the stationary member 5 and a no-material portion 26 extending out from the no-material portion 18 along the load receiving member 2, there is defined the pull-type coupling member 10, so that the latter is linked, on the one side, via a thin bending portion 27 to the end of the transversely elastic member 11 that is directed toward the load receiving member 2 and, on the other hand, via a thin bending portion 28 to the lever 6. Additionally, a thin bending portion 29 coupling the lever 6 to the load receiving member 2 is defined on its side that faces the pull-type coupling member 10 by the edge of the no-material portion 26 that faces the load receiving member 2 and, on its other side, by the perpendicular extension of the no-material portion 19.

The stationary member 5 has formed in it a roughly rectangular recess 30 extending out from the outer edge of the said member that faces away from the load receiving member 2, said recess serving to accommodate the magnet arrangement 13 shown in FIG. 1. To connect the compensating coil 12 shown in FIG. 1 to the lever 6, an extension piece not shown in the drawings is provided which extends out from the compensating coil 12 and to the lever 6 in FIG. 2 and is fixed, e. g. through a screwed connection, to the lever 6.

In the embodiment of FIG. 2 thus the desired elasticity characteristics are obtained by the localized bending portions 22, 23, which is advantageous with view to creating defined ratios. However, the elasticity might also be distributed over the entire length of the link members 3, 4 and the transversely elastic member 11, respectively.

We claim:

1. A load measuring apparatus, in particular a weighing scale, comprising a load receiving member being elastically deflectably guided relative to a stationary member in the direction of the load to be measured, and magnetic compensating means including a magnet arrangement, a compensating coil located in the magnetic field generated by said magnet arrangement, a pivotable lever with two arms being elastically supported by said stationary member, said compensating coil being supported by one arm of said pivotable lever, a position sensor detecting a predetermined relative position of said lever in said load measuring apparatus, and electrical means regulating the compensating current flowing through said compensating coil depending on the output signal from said position sensor such that said predetermined relative position is held, and establishing a measuring value for the load to be measured on the basis of the regulated compensating current, characterized in that the other arm (8) of said lever (6) is mechanically coupled to said load receiving member (2), that elastic displacement of the fulcrum (9) of the lever (6) takes place in the direction of deflection of the load receiving member (2), and that said position sensor (16) detects the relative position between the magnet arrangement (13) and the compensating coil (12).

2. The load measuring apparatus of claim 1, characterized in that the lever ratio between the lever arm (7) supporting said compensating coil (12) and the lever arm (8) being coupled to said load receiving member (2) is higher than 1.

3. The load measuring apparatus of claim 2, characterized in that the ratio between the elastic force of the guide means for the load receiving member (2) and the elastic force of the support for the fulcrum (9) of the lever (6) is large as compared to 1.

4. The load measuring apparatus of claim 2, characterized in that said load receiving member (2) is connected to said stationary member (5) by means of transversely elastic link members (3,4) in the form of a parallelogram guide wherein said link members (3, 4) extend along two opposing sides of the parallelogram and the load-receiving member (2) and the stationary member (5), respectively, extend along the other two opposing sides of the parallelogram, and that said lever (6) is supported on a transversely elastic member (11) extending in its longitudinal direction out from said stationary member (5) between said link members (3, 4) forming the two sides of the parallelogram.

5. The load measuring apparatus of claim 1, characterized in that the ratio between the elastic force of the guide means for the load receiving member (2) and the elastic force of the support for the fulcrum (9) of the lever (6) is large as compared to 1.

6. The load measuring apparatus of claim 5, characterized in that said load receiving member (2) is connected to said stationary member (5) by means of transversely elastic link members (3,4) in the form of a parallelogram guide wherein said link members (3, 4) extend along two opposing sides of the parallelogram and the load-receiving member (2) and the stationary member (5), respectively, extend along the other two opposing sides of the parallelogram, and that said lever (6) is supported on a transversely elastic member (11) extending in its longitudinal direction out from said stationary member (5) between said link members (3, 4) forming the two sides of the parallelogram.

7. The load measuring apparatus of claim 1, characterized in taht said load receiving member (2) is connected to said stationary member (5) by means of transversely elastic link members (3,4) extend along two opposing sides of the parallelogram and the load-receiving member (2) and the stationary member (5), respectively, extend along the other two opposing sides of the parallelogram, and taht said lever (6) is supported on a transversely elastic member (11) extending in its longitudinal direction out from said stationary member (5) between said link members (3, 4) forming the two sides of the parallelogram.

8. The load measuring apparatus of claim 1, characterized in that said load receiving member (2) is connected to said stationary member (5) by means of transversely elastic link members (3,4) in the form of a parallelogram guide wherein said link members (3, 4) extend along two opposing sides of the parallelogram and the load-receiving member (2) and the stationary member (5), respectively, extend along the other two opposing sides of the parallelogram, and that said lever (6) is supported on a transversely elastic member (11) extending in its longitudinal direction out from said stationary member (5) between said link members (3, 4) forming the two sides of the parallelogram.

9. The load measuring apparatus of claim 1, characterized in that the elasticity of said link members (3, 4) is localized to the portions (22) thereof adjoining the corners of the parallelogram, and that the elasticity of said transversely elastic member (11) is localized to the portion (23) thereof adjoining said stationary member (5).

10. The load measuring apparatus of claim 1, characterized in that said load receiving member (2), said stationary member (5), said link members (3, 4), said lever (6) and said transversely elastic member (11) are formed by the solid portions of a single-piece solid block (17), and that said solid portions are separated from one another by no-material portions in the form of gaps in said solid block (17) and are linked together only at localized solid portions (22, 23, 27, 28, 29) of said solid block.

* * * * *